United States Patent
Elton et al.

(10) Patent No.: US 8,639,053 B2
(45) Date of Patent: Jan. 28, 2014

(54) METHODS AND SYSTEMS FOR UP-SCALING A STANDARD DEFINITION (SD) VIDEO TO HIGH DEFINITION (HD) QUALITY

(75) Inventors: John H. Elton, Atlanta, GA (US); Lyman P. Hurd, Sandy Springs, GA (US); Carlos M. Diaz-Perez, Atlanta, GA (US)

(73) Assignee: Dimension, Inc., Las Vegas, NV (US)

( * ) Notice: Subject to any disclaimer, the term of this patent is extended or adjusted under 35 U.S.C. 154(b) by 106 days.

(21) Appl. No.: 13/353,276

(22) Filed: Jan. 18, 2012

(65) Prior Publication Data

US 2013/0077887 A1 Mar. 28, 2013

Related U.S. Application Data

(60) Provisional application No. 60/143,813, filed on Jan. 18, 2011, provisional application No. 61/540,204, filed on Sep. 28, 2011.

(51) Int. Cl.
*G06K 9/40* (2006.01)
(52) U.S. Cl.
USPC ............................ 382/264; 382/249; 382/299
(58) Field of Classification Search
USPC .............. 345/3.3; 348/E11.013; 375/E7.204; 382/148, 249, 264, 299
See application file for complete search history.

(56) References Cited

U.S. PATENT DOCUMENTS

| | | | |
|---|---|---|---|
| 4,694,407 A * | 9/1987 | Ogden | 345/441 |
| 5,065,447 A | 11/1991 | Barnsley | |
| 5,754,704 A * | 5/1998 | Barnsley et al. | 382/249 |
| 5,850,262 A | 12/1998 | Ibenthal | |
| 5,982,441 A * | 11/1999 | Hurd et al. | 348/417.1 |
| 6,115,507 A | 9/2000 | Eglit | |
| 6,137,589 A * | 10/2000 | Obrador et al. | 358/1.16 |
| 6,141,017 A | 10/2000 | Cubillo | |
| 7,577,201 B2 | 8/2009 | Seo | |
| 7,920,151 B2 | 4/2011 | MacInnis | |
| 7,941,001 B1 | 5/2011 | Sahu | |
| 7,956,930 B2 * | 6/2011 | Sullivan | 348/581 |
| 7,995,849 B2 | 8/2011 | Raveendran | |
| 8,009,963 B2 | 8/2011 | Panda | |
| 8,111,331 B2 | 2/2012 | Arnao | |
| 8,145,013 B1 | 3/2012 | Sahu | |
| 8,165,197 B2 | 4/2012 | Douma | |

(Continued)

OTHER PUBLICATIONS

Michael Barnsley & Lyman Hurd, "Fractal Image Compression," (1st Edition, 1993), A K Peters/CRC Press, pp. 188-215.

(Continued)

*Primary Examiner* — Gregory F Cunningham
(74) *Attorney, Agent, or Firm* — Todd Partners, P.C.; Jack D. Todd

(57) ABSTRACT

A computerized system for up-scaling a source input video from a lower, first resolution to a desired output video having a higher, second resolution, using fractal zooming techniques to replace each individual source pixel of each respective frame of the source input video with a multiple of proposed replacement pixels in the vertical and horizontal dimensions having similar characteristics as the individual source pixel, converting each of the proposed replacement pixels into a desired color space for the desired output video, using low-pass filtering to reduce noise associated with each respective frame of the desired output video, down-sizing the output video to its desired resolution, and outputting each zoomed replacement frame to generate the desired output video.

30 Claims, 12 Drawing Sheets

(56) References Cited

U.S. PATENT DOCUMENTS

| | | |
|---|---|---|
| 8,208,745 B2 | 6/2012 | Stein |
| 8,254,716 B2 | 8/2012 | Levy |
| 8,493,513 B2 | 7/2013 | Sullivan |
| 2004/0172658 A1* | 9/2004 | Rakib et al. .................. 725/120 |
| 2005/0069034 A1* | 3/2005 | Dambrackas ............ 375/240.01 |

OTHER PUBLICATIONS

Ning Lu, "Fractal Imaging," (1997), Academic Press, USA (ISBN 0-12-458010-6), pp. 117-122.

* cited by examiner

FIG. 4

| $(i_d-3,j_d-3)$ | $(i_d-3,j_d-2)$ | $(i_d-3,j_d-1)$ | $(i_d-3,j_d)$ |
| --- | --- | --- | --- |
| $(i_d-2,j_d-3)$ | $(i_d-2,j_d-2)$ | $(i_d-2,j_d-1)$ | $(i_d-2,j_d)$ |
| $(i_d-1,j_d-3)$ | $(i_d-1,j_d-2)$ | $(i_d-1,j_d-1)$ | $(i_d-1,j_d)$ |
| $(i_d,j_d-3)$ | $(i_d,j_d-2)$ | $(i_d,j_d-1)$ | $(i_d,j_d)$ |

FIG. 5

$$clamp(x) = \begin{cases} MAX\_PIXEL\_VALUE & \text{if } x > MAX\_PIXEL\_VALUE \\ MIN\_PIXEL\_VALUE & \text{if } x < MIN\_PIXEL\_VALUE \\ \left\lfloor x + \frac{1}{2} \right\rfloor & \text{otherwise} \end{cases}$$

FIG. 6

$$p = \frac{\sigma_{xy}}{\sigma_x^2}, \quad q = \bar{y} - p\bar{x}, \quad \text{where } \sigma_{xy} = \frac{1}{n}\sum(x_i - \bar{x})(y_i - \bar{y}) = \frac{1}{n^2}\left(n\sum x_i y_i - \sum x_i \sum y_i\right),$$

$$\sigma_x^2 = \frac{1}{n}\sum(x_i - \bar{x})^2 = \frac{1}{n^2}\left(n\sum x_i^2 - \left(\sum x_i\right)^2\right), \bar{x} = \frac{1}{n}\sum x_i, \text{ similar for } y. \text{ Thus}$$

$$p = \frac{n\sum x_i y_i - \sum x_i \sum y_i}{n\sum x_i^2 - \left(\sum x_i\right)^2}$$

FIG. 7

$$\frac{\left(n\sum x_i y_i - \sum x_i \sum y_i\right)^2}{n\sum x_i^2 - \left(\sum x_i\right)^2} \quad \text{Formula (A)}$$

FIG. 8

$$n\sum x_i^2 - \left(\sum x_i\right)^2$$

FIG. 9

$$\left(n\sum x_i^2 - \left(\sum x_i\right)^2\right)^{-1}$$

FIG. 10    Formula (B)

$$2p\left(n\sum x_i y_i - \sum x_i \sum y_i\right) - p^2\left(n\sum x_i^2 - \left(\sum x_i\right)^2\right)$$

FIG. 11

(i) if $n\sum x_i^2 - \left(\sum x_i\right)^2 \geq 2\left(n\sum x_i y_i - \sum x_i \sum y_i\right)$ set p to ½ and use Formula (B) (FIG. 10), (ii) else if $n\sum x_i y_i - \sum x_i \sum y_i \geq n\sum x_i^2 - \left(\sum x_i\right)^2$ set p to 1 and use Formula (B) (FIG. 10), (iii) else use Formula (A) (FIG. 7).

FIG. 13

| $x_{00}$ | $x_{01}$ |
|---|---|
| $x_{10}$ | $x_{11}$ |

FIG. 12

| $A_{11}$ | $A_{12}$ | $A_{13}$ |
|---|---|---|
| $A_{21}$ | $A_{22}$ | $A_{23}$ |
| $A_{31}$ | $A_{32}$ | $A_{33}$ |

FIG. 14

| $x_{00}+e_h+e_v$ | $x_{01}-e_h+e_v$ |
|---|---|
| $x_{10}+e_h-e_v$ | $x_{11}-e_h-e_v$ |

$$If\left(\begin{bmatrix}A_{22} > c\,Max(A_{21}, A_{23})\,or\,A_{22} < d\,Min(A_{21}, A_{23})\end{bmatrix}\,and\\ \begin{bmatrix}(A_{11} \geq A_{13}\,and\,A_{31} \leq A_{33})\,or\,(A_{11} \leq A_{13}\,and\,A_{31} \geq A_{33})\end{bmatrix}\right)$$

then $ExpandGap = True.$

FIG. 15

$$If\left(\begin{bmatrix}A_{22} > c\,Max(A_{12}, A_{32})\,or\,A_{22} < d\,Min(A_{12}, A_{32})\end{bmatrix}\,and\\ \begin{bmatrix}(A_{11} \geq A_{31}\,and\,A_{13} \leq A_{33})\,or\,(A_{11} \leq A_{31}\,and\,A_{13} \geq A_{33})\end{bmatrix}\right)$$

then $ExpandGap = True.$

FIG. 16

$If\,(ExpandGap = True)\,then\,(U = T + k(T - B), L = B - k(T - B))$ $else\,(U = T, L = B)$

$$\frac{1}{16}\begin{pmatrix} 1 & 2 & 1 \\ 2 & 4 & 2 \\ 1 & 2 & 1 \end{pmatrix}$$

FIG. 19

$$\frac{1}{64}\begin{pmatrix} 1 & 2 & 2 & 2 & 2 & 1 \\ 2 & 4 & 4 & 4 & 4 & 2 \\ 2 & 4 & 4 & 4 & 4 & 2 \\ 2 & 4 & 4 & 4 & 4 & 2 \\ 1 & 2 & 2 & 2 & 2 & 1 \end{pmatrix}$$

METHODS AND SYSTEMS FOR UP-SCALING A STANDARD DEFINITION (SD) VIDEO TO HIGH DEFINITION (HD) QUALITY

CROSS REFERENCE TO RELATED APPLICATION

This application claims the benefit under 35 U.S.C. §119 (e) of U.S. provisional patent application No. 60/143,813, entitled "Improved Methods and Systems for Up-Scaling A Standard Definition Video to High Definition Quality," filed Jan. 18, 2011, and of U.S. provisional patent application No. 61/540,204, entitled "Further Improved Methods and Systems for Up-Scaling A Standard Definition Video to High Definition Quality," filed Sep. 28, 2011, each of which is incorporated herein by reference as if set forth in full herein.

FIELD OF THE PRESENT INVENTION

The present invention relates generally to systems, processes, devices, and implementing technologies that enable efficient and cost effective video up-scaling from low or standard definition (SD) quality to high definition (HD) quality for a wide range of multimedia and video applications and usages, including display of HD quality video on hand held devices, such as smart phones, computer pads and laptops, to desktop computers, and all the way up to online or television broadcasts and digital cinema.

BACKGROUND OF THE PRESENT INVENTION

There are numerous products, services, business applications and uses, both at the commercial and individual consumer level, that would benefit from a cost-effective and efficient system and processes having the capability to up-scale video from smaller sizes and/or lower resolution to larger sizes and better resolution. One example of a rapidly growing commercial use for such products is evident from the continued growth of the HD television (HDTV) market, for which an increasing amount of current video and TV content is being created to take advantage of the HD display capabilities of such display devices. However, most pre-existing video or TV content made over the last century does not exist in a format or at a level of resolution quality that can take advantage of the display capabilities of HD televisions. For example, while current HDTV supports 700-1080 lines of resolution, most older and pre-existing movie or TV content owned by the various studios, distributors, or publishers, which include "re-runs" of older TV series and movies were filmed and designed to be broadcast, distributed, and displayed using "over-the-air" broadcasting at a mere 220-330 lines of resolution. Current hardware solutions to try to improve and display higher resolution and quality content are available but are typically very slow to process and can be very expensive to implement. In addition, most existing solutions merely replicate existing lines of resolution to give the illusion of a fuller picture, without improving the quality of the actual resolution.

Fractal geometry makes it possible to represent complex images using an elegant mathematical expression, which in most cases serves as a more compact alternative to the original raw image. Much like vectors, fractals have the inherent ability to scale infinitely without any discernable loss in image quality. That is, to say, by substituting a variable within the fractal expression of an object, a new larger object can be created when the fractal expression is reinterpreted to display an image on the screen. A simple example of up-scaling from a lower resolution image 100a to a high resolution image 100b is illustrated in FIG. 1.

The ability to provide up-scaling and conversion technology to the professional market is a substantial opportunity and industry need. A recent industry report by "The Hollywood Reporter" confirms that the greatest single catalyst that could push digital television forward in the U.S. after 2010 would be conversion technology having the capability to quickly, efficiently, and cost-effectively allow content producers to up-scale or up-scan their existing video content to higher resolution. This need is due in no small part to the extensive libraries of non-HD video content owned by all of the major studios and syndication/distribution companies of successful properties, like older television series and movies, such as "I Love Lucy," "Seinfeld," "Casablanca," and the like, that would serve as excellent market attractors to higher resolution systems—if systems, methods, devices, software, or similar technologies existed and were available in the marketplace to enable such content owners or holders to deliver up-scaled content to the networks, quickly, easily, with high quality, and in a cost-effective manner.

The systems, processes, devices, and technologies disclosed and described herein provide numerous benefits and represent a substantial improvement over currently-known and available technologies that merely use, for example, pixel multiplication, line doubling, and edge interpolation—all acceptable and known up-scaling techniques, but techniques that have fallen short when it comes to delivering HD-like image quality—especially when compared with new video content that is created initially in high definition quality. Harnessing fractals' inherent resolution independence around this real world need represents an emerging opportunity in the areas of digital television, HDTV, broadband, and electronic cinema, among others.

In addition, improved processes for video up-scaling offer individual consumers, for example, the capability of taking home movies created using a video camera and up-scaling the images to the maximum resolutions available on their TV set or computer monitor, which could be up to 525 lines of resolution on a non-HD home TV or up to 1080 on a HDTV. This compares to about 240 lines of resolution provided by old VHS-quality tapes, on which many older home movie libraries were recorded.

The systems, methods, devices, and technologies described and disclosed herein represent an advance in the field of digital video up-scaling that delivers outstanding performance and image quality at the two extremes of how digital video is now produced and consumed—in the realms of the very small and the very large, up to 4 k or larger.

In the domain of the medium, the rampant growth of large-format flat panel plasma and LCD televisions has raised the bar on the quality of images that consumers now expect on movies and television shows watched in the home. People no longer record shows using videocassettes. Instead, Digital Video Recorders, Internet Video, Home Video Networks, On-Demand TV, and the next-generation of satellite and cable TV (known as IPTV-Internet Protocol Television) are the norm.

If the average consumer now expects a movie theater experience in his home, what kind of experience will they begin to demand at a real movie theater? That represents one of the biggest opportunities for digital video ever. In the domain of the very large, the systems, methods, devices, and technologies described and disclosed herein raise the bar on the level and quality of resolution that is available in movie theatres. The movie industry has been undergoing a massive shift that has been years in the making to be the next frontier in which digital changes everything. The systems, methods, devices, and technologies described and disclosed herein provide the capability to deliver pristine cinematic image quality and high performance in the growing industry of Digital Cinema. The systems, methods, devices, and technologies described and disclosed herein put large-format cinematic resolution digital video on the silver screen without any of the compromises and high costs that have slowed the digital movie theater revolution.

The following is a quick and high level (but non-exhaustive) list of features and improvements offered by the systems, methods, devices, and technologies described and disclosed herein that are believed to be novel and nonobvious, whether used alone or in combination with each other, and when compared with existing technologies known to the inventors:

1) use of a de-correlating color transform prior to computing domain range block distances;
2) use of JPEG-2000 reversible Color Transform to avoid loss of data in progressing from RGB→YUV;
3) comparison of pixels using only luminance information, although chrominance is also used in preferred embodiments;
4) artifact filtering;
5) choice of a domain block neighborhood that is off-center to improve performance on lines and certain edges including use of the distance to decide when to use it;
6) adding to the set of candidate range blocks in the case of video blocks from a previous frame;
7) adding blocks from a previous frame localized to the block's current location;
8) adding blocks from a previous frame motion corrected by means of information gained from a compressed representation of the video;
9) simultaneous calculation of the best p and q values to transform the block using the least squares approximation;
10) extended calculation of p and q subject to the further constraint that p lies between ½ and 1 to avoid certain artifacts in the resultant image;
11) reduced memory implementation, which reuses the results of previous multiply operations;
12) further refinement of the above techniques to maximize potential parallelism;
13) use of a final post-filter;
14) use of a post-filter (low-pass) filter whose strength depends on the degree of zooming;
15) use of "transform" methods to find the best matched block where this is a FFT or a number theoretic transform;
16) use of edge detection to guide and speed up the search for the best range block; and
17) use of a range screen containing more pixels than the domain screen (original frame) allowing range block offsets measured by fractional pixels ("superfine" screen).

The above features and improvements, as well as additional features and aspects of the inventions described and disclosed herein and will become apparent from the following description of preferred embodiments of the systems, methods, apparatuses, technologies, and techniques.

SUMMARY OF THE PRESENT INVENTION

The present invention relates generally to systems, processes, devices, software, hardware, and implementing technologies that enable efficient and cost effective video up-scaling from low or standard definition (SD) quality to high definition (HD) quality for a wide range of multimedia and video applications and usages, including display of HD quality video on hand held devices, such as smart phones, computer pads and laptops, to desktop computers, and all the way up to online or television broadcasts and digital cinema.

The system provides a method to convert or process an original source video of a given size and resolution in order to yield a video output of a larger size and/or higher resolution than the source video.

The starting size and resolution are unlimited as is the ending size and resolution. Furthermore, the output of one processing pass through the system can be fed back and re-processed through the system again to yield still higher resolutions and/or larger sizes. There is no limit to the size or resolution of what the system can produce.

Example uses of the present system include but are not limited to the following:

1) Up-scaling a YouTube video to broadcast quality television;
2) Up-scaling a standard definition television signal to HD (High Definition);
3) Up-scaling a DVD video to Blu-Ray Disc video;
4) Up-scaling an HD video to IMAX video;
5) Up-scaling a camera-phone video to fill an HD video screen; and
6) Up-scaling the output of a computer display to a digital billboard.

The system and processes described herein can be applied to content which is stored in static form to yield another static up-scaled duplicate of the original. The system can also process live video content at the point of acquisition and provide higher resolution and/or larger size throughput in real-time, in near real-time, and as an intermediate process.

Examples of such uses include:

1) Up-scaling the live stream of a web camera to an HD television; and
2) Up-scaling the live stream of an HD resolution sports event to a large movie theatre screen.

Although special existing and emerging video formats are mentioned and can be defined as target starting and target ending points, the system can scale, zoom, re-render, resample, and/or convert to and from any of them and at any custom target in between or beyond any of them. This may include fields of industry that have yet to establish prevailing standard display and file formats and/or fields that are abandoning one format in favor of newer formats that now exist, will exist, or might come into existence.

By example, in the entertainment industry alone, there exist several legacy formats, several current-day formats, and several burgeoning formats. The system and processes described herein are independent of any of these formats proper, so while reference to them is illustrative of likely uses, it is important to understand that the scope of the present invention is not in any way constrained by any specific video formats: current, existing, descending, emerging, obsolete, experimental, custom, proprietary, or anything in between or beyond.

The system can also be run effectively in reverse. That is to say, the target output may be smaller in size and/or smaller in resolution than the source provided. The system can process directly from one size and/or resolution to another or stop and reprocess at each step. The system can up-scale to sizes in between and beyond the ranges specifically illustrated.

The motion picture industry has years of development in a concept called DIGITAL CINEMA, which also has had a trickle-down effect on other applications of videos, particularly home movies, on other devices like HDTVs and newer video-enabled devices like iPods, iPads, iPhones and their counterparts.

The present system and processes described herein will be of even greater use and importance as larger and higher-resolution video becomes more commonplace. For example, WQXGA is more commonly known as "2 k video." Digital Light Projection is already pushing that envelope to 4 k, which is already being demonstrated to theatre owners, and 8 k and even 16 k. The digital version of the IMAX standard is closer to WQXGA 2 k (rectangular 16:9 aspect ratio) and QSXGA 2 k (square 5:4 aspect ration), but is itself a massive compromise from its analog predecessor—which is projected from celluloid film rather than digital video. It is theorized that projection of a true IMAX film frame would translate to 12000×8700 "theoretical pixels," which translates to 6120× 4500 "actually discernible pixels." The significance of this is that a true analog form of IMAX is essentially a 6 k video image.

The point is this—the current so-called "FULL HD" of 16:9 1080 is hardly the end of the line for the future of video quality. 2 k video quality is already routinely available in movie theaters and 4 k video quality has already been demonstrated and tested to theatre owners. 8 k and 16 k and even higher resolutions will surely follow. Up-scaling is not just about a bigger picture, it is about a sharper picture—so this trend at the upper end not only has no end in sight, but it has a long tail of future expansion that has already presented itself.

Some movie theaters are already projecting 4 k "CineAlta" offered by Sony Corporation that has to be shot with specially-designed 4 k cameras. What happens when all movie theatres project in 4 k but also want or need to run 2 k or less-than-2 k movies? What will happen when IMAX jumps to what it plans to call IMAX HD, which will be a digital version of the analog 6 k picture? What about all the Digital IMAX movies that have already been produced and released at 2 k output—movies like "AVATAR?"

But movies and TV are all just one part of one segment, namely, the entertainment industry. Even within that entertainment industry segment, there are further industry sub-segments including but are not limited to:
  Mobile/Wireless (e.g., handheld devices, Android, iOS, iPhone, Blackberry, camcorders);
  Web and PC (e.g., PC, Mac, Quicktime, AVI, WebM, HTML5, Ustream, v-blogging);
  Home Video (e.g., DVD, Blu-Ray, Roku, Netflix, IPTV, cable, satellite, DVR, flip-video devices);
  Video-On-Demand/Pay-Per-View/MSO (e.g., iTunes, Netflix, LodgeNet, Spectravision, ePIX, OnDemand, AT&T U-Verse, RED In-Flight, GBTV);
  Adult Entertainment/Transactional Content (e.g., NOOF, AEBN, Videobox, Playboy);
  Digital Cinema (e.g., Sony, IMAX, Christie, Texas Instruments); and
  Videogame Devices (e.g., Sony Playstation, Microsoft Xbox, Wii, and other game engines and consoles).

Digital video is everywhere. Other fields and business applications include but are not limited to:
  Medical imaging
  Video Surveillance/Security
  Military recognizance
  Space/Oceanic drone-based exploration
  Cosmological/telescopic imaging
  Genomic/microscopic imaging
  Meteorological/radar imaging
  Digital Signage/Billboards
  Traffic Management/City Planning/Public Safety
  Machine-vision/Manufacturing Quality Control
  Telecommunications/Video Conferencing
  Security/Facial Recognition/Biometrics
  Augmented Reality/Virtual Reality
  Gesture-based computing/Motion Capture
  Consumer Media/Home Network/Media Hub
  Distance Learning/CBT (Computer-Based Training)
  Legal/Discovery Repositories/Court Presentation Systems Briefly described, aspects of the present invention include at least the following. A computerized system for up-scaling a source video having a lower, first resolution to a desired output video having a higher, second resolution, wherein each video is comprised of a plurality of sequentially-ordered frames of images and wherein each respective frame of images is comprised of a plurality of pixels and wherein each respective resolution is defined by the number of rows and columns of pixels in the respective frame, comprising at least one processor, a memory storage, and a computer readable medium that is usable by the at least one processor and is operatively coupled to the memory storage, the computer readable medium having stored thereon a sequence of instructions that, when executed by the at least one processor, causes the execution of the steps of, for each respective frame of the source video that needs to be up-scaled, using fractal zooming upon each individual source pixel of the respective frame to generate a plurality of proposed replacement pixels for the desired output video to replace the individual source pixel from the source video, wherein the number of proposed replacement pixels is based on a zoom factor X, wherein X is an integer value greater than 1, and wherein the number of proposed replacement pixels equals X number of proposed replacement pixels in both the horizontal and the vertical dimensions of a corresponding proposed replacement frame, wherein the proposed replacement frame has an interim resolution equal to or greater than the higher, second resolution of the desired output video, wherein the step of using fractal zooming upon each individual source pixel to generate a plurality of proposed replacement pixels includes (i) identifying a plurality of candidate pixels from the source video and (ii) selecting a group of X squared pixels from the plurality of candidate pixels that best matches the individual source pixel to be the plurality of proposed replacement pixels, converting each of the proposed replacement pixels in each of the corresponding proposed replacement frames into the desired color space for the desired output video, processing each proposed replacement frame through a low-pass filter to reduce noise in the image associated with each respective proposed replacement frame, if the interim resolution of each of the proposed replacement frames is greater than the second resolution of the desired output video, down-sampling each of the proposed replacement frames to generate respective final frames, wherein each respective final frame is set to the second resolution of the desired output video, and outputting each of the respective final frames to generate, when viewed in sequential order, the desired output video, which is the up-scaled version of the original video.

In a feature, the computer readable medium further causes execution of the step of receiving all or a portion of the source video, wherein all or a portion of the source video is stored in the memory storage. In some features, the step of receiving all or a portion of the source video includes receiving a portion of the source video in a video streaming feed.

In another feature, the computer readable medium further causes execution of the step of de-interlacing the source video. In some features, the computer readable medium further causes execution of the step of de-interlacing each respective frame of the source video as it is received.

In yet another feature, the computer readable medium further causes execution of the step of confirming that the lower, first resolution of the source video is at a desired starting resolution before performing the step of using fractal zooming. In some aspects, the computer readable medium further causes execution of the step of trimming rows of pixels from each respective frame of the source video to set the lower, first resolution of the source video to the desired starting resolution. In another feature, the computer readable medium further causes execution of the step of trimming columns from each respective frame of the source video to set the lower, first resolution of the source video to the desired starting resolution.

In an additional feature, the computer readable medium further causes execution of the step of confirming that the pixels of the source video are in a desired color space before performing the step of using fractal zooming. In another feature, the computer readable medium further causes execution of the step of converting the pixels of each respective frame of the source video into a predetermined color space before performing the step of using fractal zooming, wherein the predetermined color space is selected from the group consisting of RGB, YUV, and YCbCr.

In yet a further feature, the step of identifying a plurality of candidate pixels from the source video includes dividing each respective frame of the source video into a plurality of non-overlapping domain blocks. Further, each domain block comprises one of the respective individual source pixels and is surrounded by a plurality of context pixels to define a 3×3 block of pixels, each domain block being unique to its respective individual source pixel of the respective frame. Yet further, the step of identifying a plurality of candidate pixels from the source video further includes defining a plurality of range blocks for each of the respective frames, wherein the number of pixels in each of the plurality of range blocks is the same as the number of pixels in each of the plurality of domain blocks, wherein the pixels in each range block are computed by a filtering operation applied to the respective frame of the source video at locations spread out by a constant factor greater than 1 in both the horizontal and the vertical dimensions. Preferably, each range block is comprised of nine pixel values, each pixel value representing the average of a block of 4 adjacent and non-overlapping pixels taken from a 6×6 block of pixels from the respective frame and wherein the 4 central pixels of each range block represent one of the group of X squared pixels from the plurality of candidate pixels.

In another feature, the step of selecting a group of X squared pixels from the plurality of candidate pixels that best matches the individual source pixel comprises comparing the domain block associated with the individual source pixel with a plurality of range blocks within a predetermined distance from the respective domain block and selecting the 4 central pixels from the most similar range block as the plurality of proposed replacement pixels to replace the individual source pixel in the proposed replacement frame. Further, the 4 central pixels from the most similar range block selected as the plurality of proposed replacement pixels to replace the individual source pixel in the proposed replacement frame are multiplied by a factor p, wherein the value of p is preferably set to a value between ½ and 1.

In another feature, the step of selecting a group of X squared pixels from the plurality of candidate pixels that best matches the individual source pixel comprises comparing intensity values and distance metrics between the domain block associated with the individual source pixel and with the plurality of range blocks within a predetermined distance from the respective domain block.

In yet a further feature, the step of fractal zooming is performed separately for each color component of each of the respective individual source pixels of the respective frame. In an alternative embodiment, the step of fractal zooming is performed simultaneously for each color component of each of the respective individual source pixels of the respective frame.

In another feature, the step of selecting a group of X squared pixels from the plurality of candidate pixels that best matches the individual source pixel to be the plurality of proposed replacement pixels comprises comparing luminance and chrominance values. Alternative, the step of selecting a group of X squared pixels from the plurality of candidate pixels that best matches the individual source pixel to be the plurality of proposed replacement pixels comprises just comparing luminance values. In yet another alternative embodiment, the step of selecting a group of X squared pixels from the plurality of candidate pixels that best matches the individual source pixel to be the plurality of proposed replacement pixels comprises comparing luminance and chrominance values, but weighing the luminance value higher than the chrominance values.

In another feature, the computer readable medium further causes execution of the step of applying artifact filtering to each of the plurality of proposed replacement pixels in the corresponding proposed replacement frame to ensure that each of the plurality of proposed replacement pixels does not differ above a first predetermined threshold from its adjacent pixels in the corresponding proposed replacement frame.

In yet a further feature, the computer readable medium further causes execution of the step of applying smoothing techniques to each of the plurality of proposed replacement pixels in the corresponding proposed replacement frame to ensure that each of the plurality of proposed replacement pixels does not differ above a second predetermined threshold from its respective source pixel from its respective frame of the source video.

In another feature, the step of down-sampling comprises uses of linear methods to reduce the resolution of each respective final frame. Alternatively, the step of down-sampling further comprises uses of padding methods to add width to the resolution of each respective final frame.

The present invention also encompasses computer-readable medium having computer-executable instructions for performing methods of the present inventions, and computer networks and other systems that implement the methods of the present inventions.

The above features as well as additional features and aspects are disclosed herein and will become apparent from the following description of preferred embodiments of the inventions disclosed and described herein.

BRIEF DESCRIPTION OF THE DRAWINGS

Further features and benefits of the present inventions will be apparent from a detailed description of preferred embodiments thereof taken in conjunction with the following drawings, wherein similar elements are referred to with similar reference numbers, and wherein:

FIG. 4 illustrates a table of range block locations associated with a preferred domain block used by the fractal zooming techniques implemented by the system, processes, and techniques associated with the inventions described herein;

FIG. 5 illustrates a clamping operation equation used by the fractal zooming techniques implemented by the system, processes, and techniques associated with the inventions described herein;

FIGS. 6-11 illustrate a set of equations used to optimize the search and matching operations used by the fractal zooming techniques implemented by the system, processes, and techniques associated with the inventions described herein;

FIGS. 12-14 illustrate tables of pixel values and corrections used for artifact filtering as part of the techniques implemented by the system, processes, and techniques associated with the inventions described herein;

FIGS. 15-17 illustrate equations used for optional, additional artifact filtering as part of the techniques implemented by the system, processes, and techniques associated with the inventions described herein;

FIGS. 18-19 illustrate two exemplary low pass filters used to reduce noise in the zoomed images generated as part of the techniques implemented by the system, processes, and techniques associated with the inventions described herein.

DETAILED DESCRIPTION OF PREFERRED EMBODIMENTS

Introduction:

The systems, methods, devices, software, hardware, and technologies described and disclosed herein are directed generally to the zooming or resampling of images by means of fractal techniques and processes and in particular the zooming of video images. Of particular interest is the application of these techniques to render a standard definition (SD) video signal to high definition (HD), which typically means resizing each frame of a video from 720×480 pixels up to 1920×1080 pixels. It may also involve the additional step of de-interlacing, which is assumed to be done, but is outside the scope of the present disclosure.

The core observation of fractal zooming is that images contain within them features that are similar but at different length scales. A portion of the image is zoomed by finding another, typically nearby, region of the image, which expresses the desired feature at a longer length scale. There are many details to be considered, but, at a high level view, the basic methodologies and techniques described herein include a search for features, a transformation step, and then a replacement.

Figure 2:
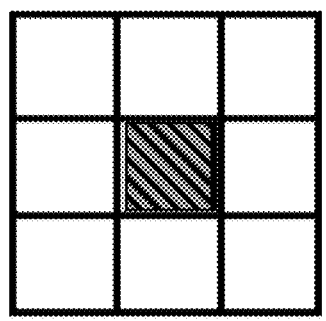
FIG. 2 illustrates a sample domain block used by the fractal zooming techniques implemented by the system, processes, and techniques associated with the inventions described herein.

Domain and Range:

To accomplish up-scaling of an image, such image is preferably first divided into a plurality of domain blocks, as illustrated in FIG. 2. To create a set of domain blocks, the image is partitioned into non-overlapping blocks (typically 1×1 or 2×2 in size). Then, these blocks are expanded to include "context" pixels (shown as white blocks) surrounding the core "image" pixels (shown as the black hashed block) so that, in the end, one has a set of overlapping blocks for which every original pixel lies in the central region of a unique block. Typically, the 1×1 core is expanded by adding an immediate boundary to form a 3×3 expanded domain block, as shown in FIG. 2.

Figure 1:
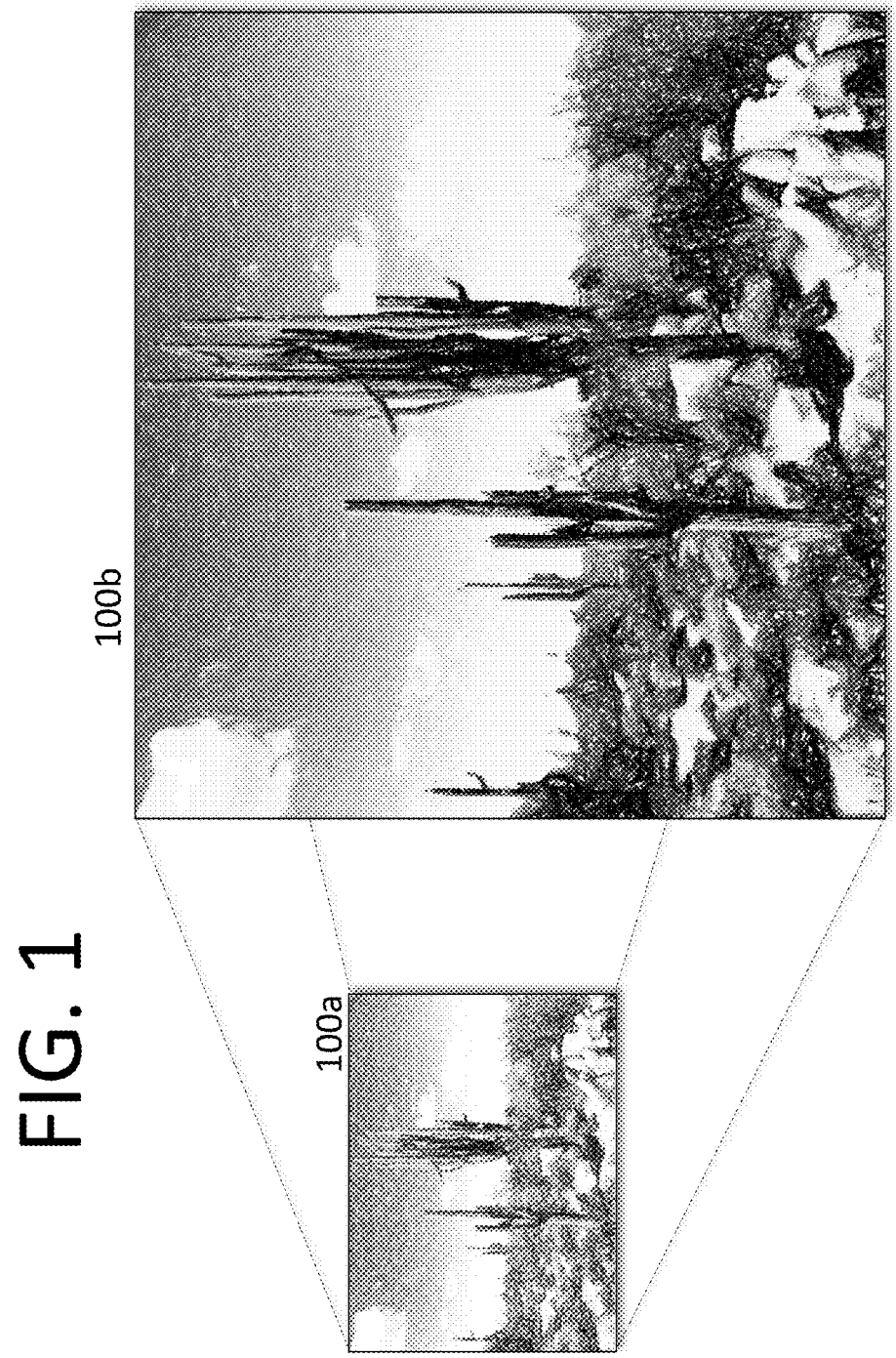
FIG. 1 illustrates an example up-scaling of a first video image having a first resolution to a second video image having a second, larger resolution by means of the system, processes, and techniques associated with the inventions described herein.
Figure 3:
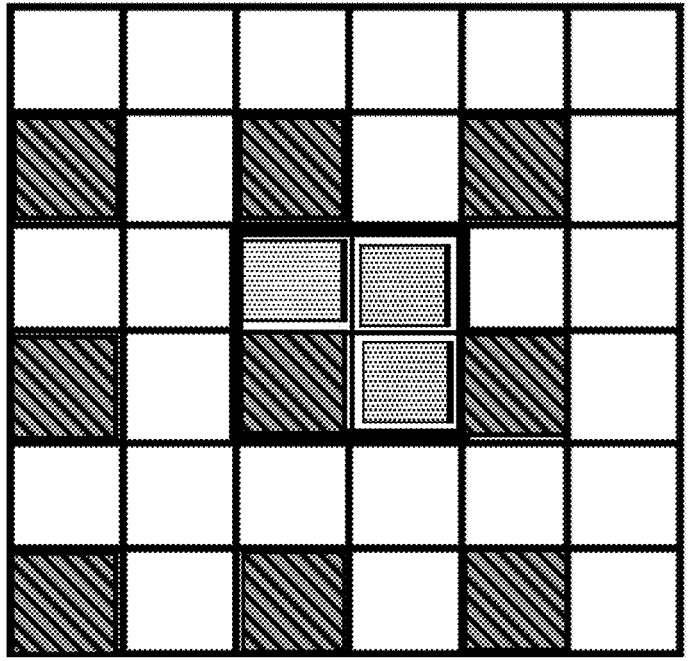
FIG. 3 illustrates a sample range block used by the fractal zooming techniques implemented by the system, processes, and techniques associated with the inventions described herein.

In addition to the domain blocks, the system preferably defines a set of range blocks, as shown in FIG. 3. Range blocks preferably have the same number of pixels as the domain block. The pixels in a range block are computed by a filtering operation applied to the image at locations spread out by a constant factor greater than one in each dimension. Preferably, with 3×3 domain blocks, a range block is computed from a 6×6 block of pixels in the image by averaging non-overlapping groups of four adjacent image pixels within the 6×6 block, to create nine range block pixels (shown as the black hashed blocks in FIG. 3). The image pixels are illustrated as the four central pixels. The context pixels (i.e., in a preferred embodiment, the outer 8 pixels of the domain block—(the white blocks shown in FIG. 2)) are used to help in matching but the actual zoom step will consist of choosing an ideal range block by criteria to be described below, transforming it, and then replacing the single central pixel in the domain by the transformed central pixels of the range.

To help with the search, the range screen is preferably preprocessed to apply a box filter, thus replacing each pixel value with the average of the pixel and its three neighbors to the right, below, and diagonally to the right.

To restrict the search, the system preferably considers just those pixels on the range screen—whose upper left corner lies within a fixed distance of the corresponding domain block. In a preferred implementation, sixteen candidate blocks are used whose upper left corner $(i_r, j_r)$ is related to the domain block's upper left corner $(i_d, j_d)$ by:

$$i_d - 3 \le i_r \le i_d \text{ and } j_d - 3 \le j_r \le j_d$$

Stated differently, for a 3×3 domain block whose upper left corner is $(i_d, j_d)$, the sixteen 6×6 blocks with upper left corner set to the values in the table shown in FIG. 4 are considered. It is possible to vary the set of range blocks considered with respect to the original domain. For example, it is possible to use edge detection filters to determine a direction for the block and use that information to customize the search neighborhood, for example, concentrating on blocks lying along the edge.

Ordinarily, the range blocks within an image will not provide sufficient variability to match each domain block; therefore, the list of candidates can be expanded by considering linear combinations of the pixel values of a block. Letting $r(i,j)$ denote the intensity value of the pixel at position $(i,j)$ within a specific range block, the set of candidate range blocks can be generalized by also considering transformed blocks whose intensities $r'(i,j)$ are given by:

$$r'(i,j) = \text{clamp}(pr(i,j) + q)$$

It should be noted that the values p and q are constants for the block. The clamping operation, shown by the equation in FIG. 5, ensures that the result is a legal pixel value. In the preferred embodiment, this means that the result is an integral value between 0 and 255. Further, clamping is preferably only performed after a final candidate block has been selected and is not performed during intermediate calculations. The preferred embodiment further adds the stipulation that p be constrained to lie between ½ and 1, as this appears to result in better visual quality at the expense of a little complexity.

Extended Range Screens:

There are some methods that can be used to augment the list of candidate range blocks. One method is to start from a range screen, which consists of a higher resolution version of the original frame. This higher resolution screen can be computed in a number of ways, such as, for example, by pixel replication, by linear or bi-cubic interpolation. The resolution of this higher resolution range screen preferably has dimensions an integral multiple of the original, which is mathematically equivalent to allowing range blocks to occupy addresses with fractional coordinates with respect to the domain screen. This technique is called "superfine" resolution." A second method is to add to the list of candidate blocks for a given domain, a fixed set (known as a vector quantization or VQ codebook) a fixed set of blocks that are always available.

In the case of zooming video, it is possible to augment the set of candidate range blocks chosen from the current frame by a set of blocks taken from the corresponding location on the previous frame or frames, since there is typically a substantial number of image and pixel replication or similarity between adjacent frames of a video. In the simplest case, one can add to the list of candidate range blocks, blocks taken from the corresponding position on the previous frame or frames.

It is also possible to use motion compensation to compute the area of the previous frame that most resembles the current area of the frame. While this can be computed on the fly, in many cases the video being zoomed will be expressed via a compressed representation, such as MPEG-2 or H.264, and in that case the bit stream being decompressed will already contain motion information about any specific region of the image. In case it does not, one can either assume zero motion or compute it explicitly. If desired, this process can be applied recursively to add blocks from frames prior to the previous one.

Search:

The problem now reduces to finding, for each domain block, the best range block and p and q values for some definition of "best." There are two steps to the comparison. First, the candidate range block is reduced to the same size as the domain block to make them comparable (alternatively, it is possible to increase the size of the domain block to match the size of the candidate range block to make them comparable in size). In a preferred embodiment, a block filter is used to average the intensity values of each 2×2 block. In general, any suitable low-pass filter coupled with a 2×2 subsampling process would suffice. Preferably, the subsampling is done once for the entire range screen before the search is conducted.

Next, once a set of vectors of intensity values of the same size is determined, a distance metric is then chosen. Typically, it is preferable to use the SSE (sum of squared errors) to determine such distance metric. In an alternative embodiment, the SAD (sum of absolute differences) is used.

It is also possible to use features of the blocks to assist in making the comparison. For example, an edge detector can be applied to the domain and its surroundings, and range blocks not evidencing similar edge features can be penalized in the comparisons.

Borders:

Obviously, at the border of a video frame, some of the typically-used context pixel coordinates in the domain block will not lie within the picture, i.e., they will not be within the boundaries or parameters of the video frame. Also, when considering range blocks, some of the typically-used candidate range blocks will also lie outside the picture edge. There are at least several approaches to address or handle this issue. A first approach merely reduces the size of the image to be zoomed via fractals by considering only the inner pixels and not using fractal zooming for the border pixels. This leaves the problem of zooming the border by some other means—such as linear interpolation or cubic interpolation (or other methods known in the art). Alternatively, it is possible to extrapolate the edges to add context to the image. This can be done by padding the image with a constant border, replicating pixels at the edges, or using extrapolation techniques such as linear extrapolation, which is also known in the art. In the preferred embodiment, the system replicates pixels to pad the image. Preferably, in each row 4 copies of the first pixel are prepended to the row and 4 copies of the last pixel are appended to the end. Then 4 copies of the first padded row are prepended to the beginning of the buffer and 4 copies of the last row are appended to the end.

To deal with range blocks lying outside the picture, one can simply eliminate from consideration those skip blocks, or one can re-center the set of range blocks under consideration such that there are the same number of candidates; however, they would no longer be symmetrically located with respect to the domain block but would be shifted into the boundaries of the picture or video frame. For example, if the domain block lies on the left edge of the picture or frame, when deciding which range blocks to search, the formula given earlier:

$$i_d - 3 \le i_r \le i_d$$

can be replaced by the following exemplary formula, which re-centers the set of range blocks under consideration (in this case by shifting the range blocks by three to the right or away from the left edge of the picture):

$$i_d \le i_r \le i_d + 3$$

A similar shifting of range blocks at the top or bottom of the picture or frame can be achieved by offsetting the candidate range blocks normally chosen using the formula:

$$j_d - 3 \le j_r \le j_d$$

and then shifting the range of candidate blocks up or down, as necessary.

Non-Centered Blocks:

Some visual features do not lend themselves to good match when one tries to match the center of the block and all the surrounding pixels. Sometimes, it is beneficial to match a block that works well with the context on one side of the block. This can be thought of as redefining the domain block so that the context pixels are no longer symmetrically allocated with respect to the image pixels. A simpler approach that gives the same result is to modify the distance metric between blocks so that some of the border pixels in both the domain and range are not considered in the distance calculation.

Since the new search produces values that cannot be directly compared to the old search (for example, one could potentially be comparing vectors of different lengths), this approach assumes the steps of determining that the first search came up with a block whose error was greater than some pre-defined threshold. This threshold can be a fixed value obtained statistically from either all the blocks considered so far or just from blocks viewed locally. If this threshold is reached, then a new search is undertaken using a different neighborhood (i.e., with some pixel locations weighted to zero) and the best block based on those comparisons is taken. In some cases, there may be more than one candidate pattern and the same approach is taken in each case.

Search Optimization:

In some embodiments, a fixed number of candidate p values are set up and a search over candidate range blocks is conducted. In this case, the q is determined by taking the difference between p times the mean of the range block and the mean of the domain block. Technically, if the desired metric is the sum of absolute differences, the appropriate metric is the difference in the medians; however, generally computing medians is harder than means and the difference is not likely to be great.

In a preferred embodiment, the best block in the sense of sum of squared errors (SSE) is chosen and determines the best p and q in one pass. The innermost loop of any search consists of those calculations that need to take into account both the domain block and the range block. By careful bookkeeping, one can reduce the calculations to: (i) properties only of the domain block, which can be computed and stored, (ii) properties only of the range block, which leaves the only remaining quantity to be computed, (iii) the dot product of the domain and range. As will be discussed hereinafter, there are additional ways to reduce the number of computations even further. Note, as will be explained hereinafter, the pixel values in domain and range blocks may be determined by specifying a row and column. Since the spatial arrangements are not important, the pixels in a block are treated as a one-dimensional vector.

Using the notation that x represents the range block and y the domain block, the system attempts to determine values of p and q to minimize the squared error between y and p x+q (where q represents the vector consisting of copies of the scalar q, in other words, q=(q, $q_1$ ... )). The system preferably uses the set of equations, as shown in FIG. 6. The important point that should be noted, with regard to the set of equations in FIG. 6, is that of the four expressions that make up the computation of p, only one of these depends on both x and y together.

The search optimization further includes the step of finding the range block x for a given domain block y by minimizing the least squares distance. Removing terms involving only x, the minimum squared distance is achieved by choosing the y that maximizes the quantity calculated, using Formula (A), as shown in FIG. 7. The quantity computed by Formula (A) is proportional to the sum of squared errors, and the constant of proportionality depends solely on the domain block and, therefore, can be eliminated when comparing candidate range blocks. It should also be noted that many of the terms in Formula (A) of FIG. 7 can be pre-computed by the system. For example, if one uses strictly integers, the denominator of Formula (A), shown in FIG. 8, can be calculated and stored in memory (e.g., RAM, database, or buffer) for each range block. Using floating point, one can store the reciprocal, as shown by the formula of FIG. 9, and use a multiply instead of a divide in the inner loop.

Formula (A) of FIG. 7 assumes that the value of p is unconstrained, but as noted previously, one may want for visual reasons to constrain p to lie between ½ and 1. In that case, one can clamp the p value and instead maximize results using Formula (B), as set forth in FIG. 10. Combining the two techniques offered by Formulas (A) and (B) leads to the algorithm shown by the equation in FIG. 11.

Further Search Optimization:

The previous section shows that the search portion of the algorithm described above and used by the present system can have its inner loop, (i.e., the portion of the algorithm that relies both on the chosen range and domain), reduced to the computation of a dot product between the domain and range blocks. In the preferred embodiment, using 3×3 domain blocks, each range-domain pair uses 9 multiplications and 8 additions.

However, at the cost of memory look-ups, there are even more computational and time savings possible due to the fact that the domain blocks overlap one another. The second domain block in scan order, for example, shares two of its three columns with the first domain block. Similarly, many of the range blocks compared to a given domain block are also compared to neighboring domain blocks.

In the previous section, the dot product between a range block represented by x and a domain block represented by y was expressed as a one-dimensional sum:

$$\Sigma x_i y_i$$

However, if the blocks are thought of in terms of their rows and columns, the above one-dimensional sum equation can be re-written as:

$$\sum_j \left( \sum_i x_{i,j} y_{i,j} \right)$$

The quantity in the parentheses represents the dot product of a single column of the range block and the corresponding column of the domain block. By keeping a look-up table of the products of domain and range column dot products, it is possible to reduce the number of multiplies by roughly a factor of three, as is accomplished in the preferred embodiment, since every column except for the ends serves as the leftmost, middle, and rightmost column in some domain block.

Transitioning to the next row of domain blocks also provides a potential savings in time and computational resources needed. One pre-computed column dot product from the first row includes, for example, the sum $S_1 = x_1 y_1 + x_2 y_2 + x_3 y_3$ (here, only i subscript values are shown since j is fixed in a single column). For this new row, it is necessary to compute $S_2 = x_2 y_2 \, x_3 y_3 + x_4 y_4$, but provided the product of $x_1$ and $y_1$ are stored in memory, one can quickly calculate or determine this new value with a single new multiply, as $S_2 = S_1 - x_1 y_1 x_4 y_4$.

The procedure above suffers one drawback in a parallel implementation because it requires that each row be computed before the next row can be. In some embodiments, it may be the case that there are enough parallel processors available that it is desirable to do even more computation in parallel. If so, then the system merely modifies the above calculation slightly to compute the column dot products of every third row (in the preferred case, i.e., or as many rows as it takes to make the domain blocks non-overlapping). Then, the remaining rows can be computed based on either the preceding or following row of column sums.

Transform Methods:

There is a more subtle form of redundancy that does not rely on the block overlaps. This includes the redundancy present when one transforms the image using a Fourier Transform (including "fast" Fourier Transform, FFT) or number theoretic transform (NTT). See, for example, http://www.eumus.edu.uy/eme/cursos/dsp/material/libros_html/mdft/Number_Theoretic_Transform.html. The quantity being sought is the correlation, which is computable in frequency space. However, these methods tend to be more effective as the block size is increased.

Color Space:

The preceding sections assume that the buffers consist of an array of numbers; however, it is more typical for the images to be colored images with more than one value corresponding to a single pixel. It is possible to zoom each color component separately, but in the preferred embodiment, the three color components are handled simultaneously and, therefore, one range block location is made to serve for all three color components (although the values of p and q will differ for each color component).

It has been shown to benefit quality if, prior to zooming, the image is decomposed into a luminance/chrominance representation (such as YCbCr, YUV, or other transforms well known in the art). In the preferred embodiment, the reversible color transform (RCT), introduced in the JPEG-2000 standard, is used. The RCT has the benefit of de-correlating the luminance and chrominance while introducing no loss when an image is converted from RGB to YCbCr and back.

The reversible transform (R,G,B)→(Y,Cb,Cr) is given by:

$$Y = \text{floor}(\tfrac{1}{4}(R+2G+B))$$

$$Cb = B - G$$

$$Cr = R - G$$

It should be noted that the above formula does have the effect of requiring one more bit of precision in Cb and Cr than was present in (R,G,B).

The system computes the distortion metric inherent in the search step by weighting the contributions of the luminance (Y) and chrominance (Cb, Cr) components. In the preferred embodiment, the chrominance is weighted by ¼. In some instances, it appears to be acceptable to compute the distortion based only on the luminance (i.e., by weighting the chrominance components by 0). The system can also take a hybrid approach in which the initial search is conducted solely over luminance and then a small number of candidates is chosen based on their chrominance distortion, or the winner is kept provided the chrominance distortion does not exceed a specified threshold.

Artifact Filtering:

The search phase of the algorithm has led to two pieces of data. There is a chosen range block representing an address on the original frame, and there is a multiplicative factor p. Preferably, the four pixel values from the original frame corresponding to the center of the range block will be multiplied by p and taken preliminarily as the four values representing the zoom of the original pixel. As mentioned in earlier sections, there will also be an additive correction q made, which will be shown in the computations that follow.

Preferably, each new pixel will be subjected to an "artifact filter" to ensure that the new pixel values do not differ unreasonably from their neighbors. This correction is done first horizontally and then vertically. Assume that the domain pixel to be replaced is represented by the value $A_{22}$ pictured along with its eight neighbors in the table shown in FIG. 12.

Next, the zoom algorithm replaces the original value $A_{22}$ by four new values ($X_{00}$, $X_{01}$, $X_{10}$, $X_{11}$) preliminarily representing the "zoomed" pixel (these are the four pixel values referred to above, multiplied by p), as illustrated in the table shown in FIG. 13.

Then, if the averages are defined as:

$$a' = \tfrac{1}{2}(x_{00}+x_{10}), \text{ and } b' = \tfrac{1}{2}(x_{01}+x_{11}), \text{ and let } a = A_{21}, b = A_{23}.$$

Considering the four pixels (two domain pixels and two averaged range pixels):

$$a\ a'\ b'\ b$$

If they were to lie in a straight line, then:

$$b - a = 2(b' - a').$$

If they were on either side of a hard edge (i.e., $a = a'$ and $b = b'$) then:

$$b - a = b' - a'.$$

If $a \le b$ and $a' > b'$ (or $a \ge b$ and $a' < b'$), the system defines a horizontal correction factor as:

$$e_h = \tfrac{1}{2}(b' - a') \tag{H1}$$

Otherwise (i.e., if a−b and a'−b' have the same sign) and if in addition, $$|a' - b'| > |a - b|$$

then the system defines a correction factor by:

$$e_h = \tfrac{1}{2}((b' - a') - (b - a)) \tag{H2}$$

If neither of these conditions is met (which empirically is the majority of the time), then the system defines the correction factor as:

$$e_h = 0 \tag{H3}$$

Reasoning similarly in the vertical direction, let $a' = \tfrac{1}{2}(x_{00}+x_{01})$ and $b' = \tfrac{1}{2}(x_{10}+x_{11})$ and $a = A_{12}$, $b = A_{32}$. Now, the analog of formulas (H1) through (H3) are used to produce a vertical correction $e_v$. Finally, the four zoomed values are replaced with the values shown in the table of FIG. 14, which applies the necessary horizontal and vertical correction factors, if any.

Second Artifact Filtering:

At this stage, the block can proceed straight to the Final Mean Correction (the step described in the following section), or the system can optionally put the block through an additional set of checks first, which are now described. If the system sets $T = \max\{A_{ij}\}$ and $B = \min\{A_{ij}\}$, where the maximum and minimum are computed based on all nine values, then a mean adjustment is performed, followed by clamping the pixel values to these values or to an expanded set of values, as computed and described below.

First, the system defines three (floating point) constants: $c > 0$, and $0 < d < 1$ and $k > 0$. In the preferred embodiment, the following values have been used: $c = \tfrac{3}{2}$, $d = \tfrac{2}{3}$ and $k = \tfrac{1}{2}$.

Next, the value of ExpandGap is set to "False", preliminarily. The equation set forth in FIG. 15 determines whether the value of ExpandGap is reset to "True".

Similarly, for columns, the equations set forth in FIGS. 16 and 17 determine whether the value of ExpandGap is reset to "True" and also determine the resulting clamping values, U and L. Based on results of the calculations determined by the equations in FIGS. 16 and 17, if U exceeds the maximum possible pixel value for that color component, the system replaces U by that maximum possible pixel value; that is, the system clamps U from above so that U is not greater than the maximum possible pixel value. Similarly, the system clamps L from below so that L is not less than the minimum possible pixel value. Then, each zoomed pixel value is replaced by a mean-adjusted value:

$$x_{ij}' \leftarrow x_{ij} - (x_{00}+x_{01}+x_{10}+x_{11})/4 + A_{22}$$

Then these new pixel values $x_{ij}'$ are clamped so that $L \le x_{ij}' \le U$.

Final Mean Correction:

The calculations in the first correction step (Artifact Filtering) above compared only pixel differences, and, thus, were insensitive to the mean. The second, optional correction step (Second Artifact Filtering), if done, already includes one mean correction, and if no clamping was necessary during that process, then this "Final Mean Correction" step will have no effect. The Final Mean Correction includes the step of adjusting the four range values at this point to have the same mean as the single domain pixel they are replacing. This calculation is in lieu of computing the q value for the entire domain and range block. The intent of this correction is to preserve the property that the mean value of the four zoomed pixels equals the value of the single pixel they replaced. Round-off and clamping may make this condition inexact.

The goal is to have the mean of the four new pixels equal the value of the pixel being replaced, or, stated mathematically:

$$(x_{00}+x_{01}+x_{10}+x_{11})/4=A_{22}$$

Therefore, each pixel value is replaced with a new value:

$$x_{ij}'=x_{ij}-(x_{00}+x_{01}+x_{10}+x_{11})/4+A_{22}$$

The new pixel values $x_{ij}'$ are now finally clamped so that they are not greater than the maximum possible pixel value or less than the minimum possible pixel value for this color component. The clamping operation may change the mean value so it may not be true that the four zoomed pixels selected by the system have an average value equal to the original un-zoomed pixel.

Post-Filtering:

When all the domain pixels have been processed, the final image is subjected to a final low-pass filter to help remove some of the noise. The preferred embodiment applies a smoothing filter after all the zoom steps have been completed and the image has been transformed back into its original color space (which, in the preferred embodiment, is in RGB).

Any well known de-noising or low-pass filter can be used by the system at this stage. The preferred embodiment uses a symmetric block filter in which one-dimensional representation includes the weights (1 2 ... 2 1), where there are $2^n-1$ 2's when the zoom is by a factor of $2^n$.

Writing this filter in two dimensions and normalizing the weights, the system uses the low pass filter, as shown in FIG. 18, for the case of a 2× zoom. For the case of a 4× zoom, the system uses the low pass filter, as shown in FIG. 19.

After this filter is applied, the system determines the resultant pixel value by using a convex combination of the filtered value and the original value:

$$X_{new}=(1-\lambda)x_{old}+\lambda x_{filtered}$$

The factor $\lambda$ ranges from 0 to 1 and gives a convex combination ranging from $\lambda=0$, which represents no filtering, to $\lambda=1$, the symmetric block filter. In the preferred embodiment, $\lambda$ is left as a parameter that can be specified by the user of the system. As the zoom scale increases, the neighborhood is increased proportionately.

In an alternative embodiment, the system could use the resultant distance measure used in the search step to estimate the degree of smoothing required. In other words, blocks for which the estimated distortion is small would receive relatively smaller values of $\lambda$ than blocks for which the estimate distortion appears to be relatively high or higher than a desired threshold.

Arbitrary Scales:

The steps of the process described so far are designed to scale an image to a fixed multiple of its original size. In some instances, it is desirable to scale an image by an arbitrary size. Therefore, another aspect of the present system concerns the consideration of the desired input and output dimensions and the decomposition of the scaling task into a sequence of stages—some of which involve the use of fractal algorithms and some of which involve the use of linear methods known in the art, such as bi-cubic interpolation.

Preferably, the steps of the up-scaling process can be repeated by the system as necessary and until the source image has dimensions greater than or equal to the desired target dimension of the output video in both width and height, and then the system uses a linear method to down-sample to the desired target dimension for the output video.

If the base fractal zoom consists of a fixed factor, k (where, in preferred embodiments, k=2), the system can combine fractal and linear scaling to transform any initial dimensions (w,h) to new dimensions (w',h') by implementing the following analysis:

If w<w' or h<h', then replace w by kw and h by kh by means of a fractal scaling step and repeat, otherwise use linear methods to down sample the w×h image to w'×h'.

Interlaced and Progressive Video:

In the preferred embodiment and in the simplest situation, video is encoded as a sequence of still images much as the frames in a movie can be thought of as individual photographs. However, some video made for early television is made up of interlaced video in which the frame comprises two fields and the pixels in the even lines are coded separately from the pixels in the odd lines. The system can aim for a new video that is also interlaced, but at a higher resolution. This can be accomplished by keeping track of the fields and enhancing each separately. The domain blocks include pixels taken entirely from one or the other field. It is possible to consider only range blocks that come from the same field or it is possible to augment the list of candidates to consider range blocks from either field; however, in using the range block, pixels are taken from only one field.

SDTV to HDTV Conversion:

One of the central issues or challenges that the systems and methods described herein are intended to solve is the conversion of SDTV (standard definition) content to HDTV (high definition) content. For example, a user of the system may be interested in converting an original source video having frames that are 720×480 or that are 720×486 interlaced into an output video having frames of resolution at 1920×1080 progressive (non-interlaced). The steps of this conversion process may include de-interlacing, if necessary, which can be accomplished using any standard or known technique (or any improved technique that may be developed in the future), followed by trimming the top and bottom three rows of each frame—for example, if the source video frame is 720×486, trimming to make the frames 720×480.

The 720×480 frames are then preferably converted to YCbCr format (with three values per pixel). It should be noted that some color schemes just subsample the chrominance components, but for the preferred systems and techniques described herein, it is assumed that there are an equal number of samples in each color channel.

A 2× fractal zoom is applied twice to the 720×480 YCbCr frame to produce a frame that is 2880×1920. After the second zoom, the image is converted back to the RGB color space and the post·filter described above is performed after the second zoom step with a radius of 2 (i.e., a mask that is 5×5).

Then, there are three possibilities (or cases) to reduce the above resultant image to a 1920×1080 HD frame:

1) The resultant image can be down-sampled using linear methods by a factor of 9/16 to a 1620×1080 frame, which is then padded on each side with a 150×1080 rectangle of a fixed color to achieve a 1920×1080 frame;
2) The resultant image can be down-sampled using linear methods by a horizontal factor of 2/3 and a vertical factor of 9/16 to produce a 1920×1080 frame with a different aspect ratio from the original; or
3) The resultant image can be divided into three separate rectangles, each having the same 1080 and with widths of W, 2880-2W, and W (where 0≤W≤1440), respectively, wherein the middle rectangle is scaled by a factor of 9/16 in each dimension, and the two end rectangles are scaled vertically by 9/16 and horizontally by a factor of (9w+2400)/16w.

Figure 20:
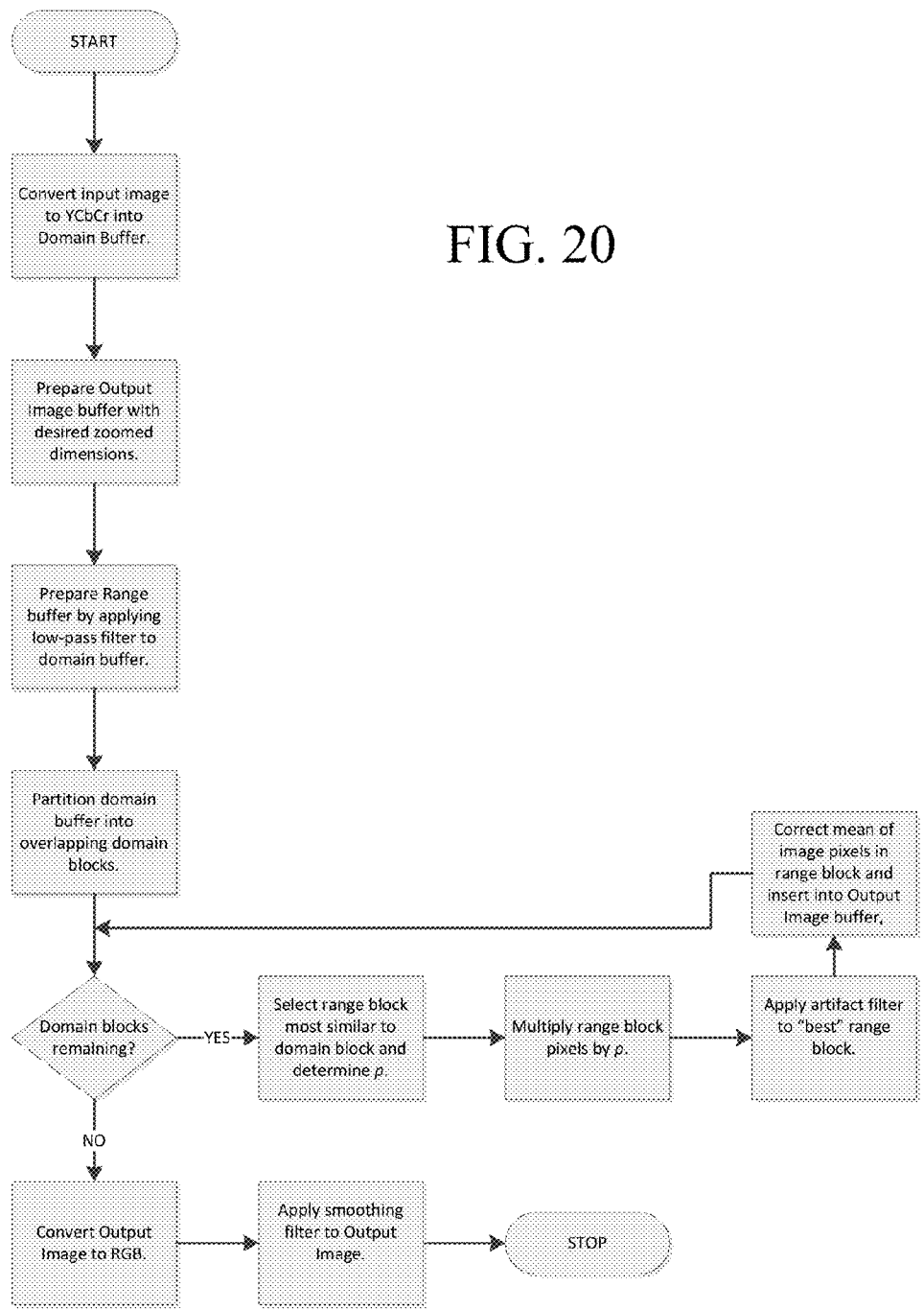
FIGS. 20-23 illustrate various flow charts of exemplary processes and steps performed by the system, processes, and techniques associated with the inventions described herein.
Figure 21:
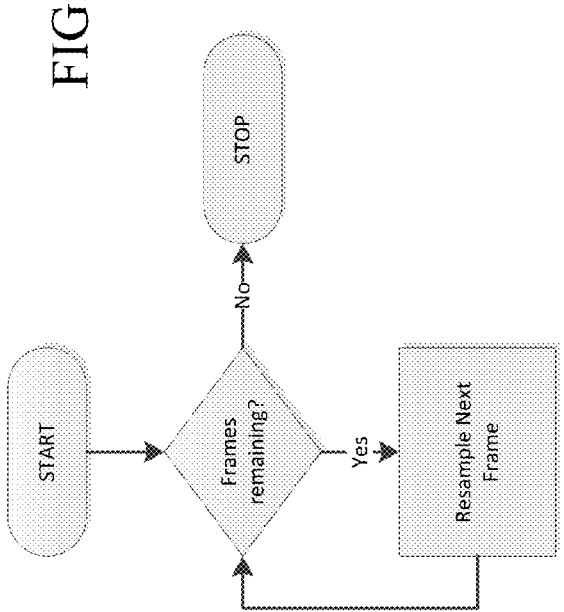
Figure 22:
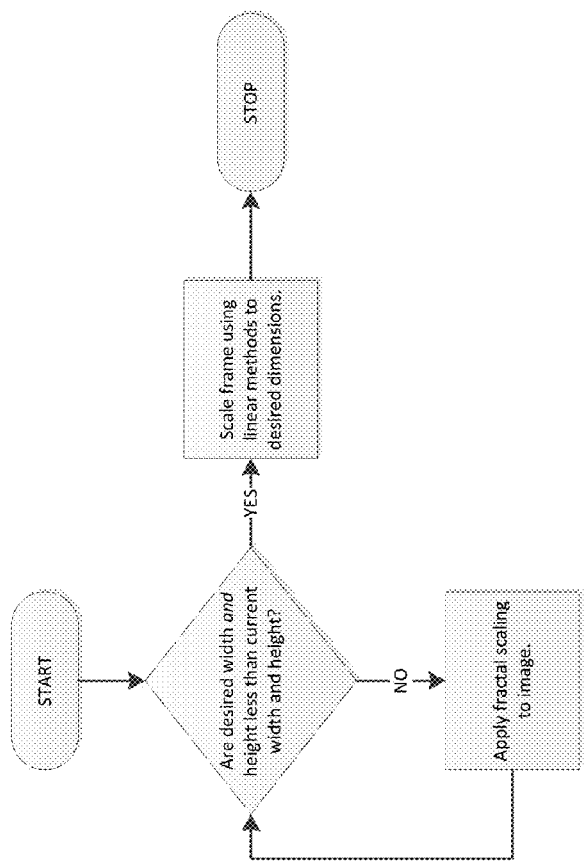
Figure 23:
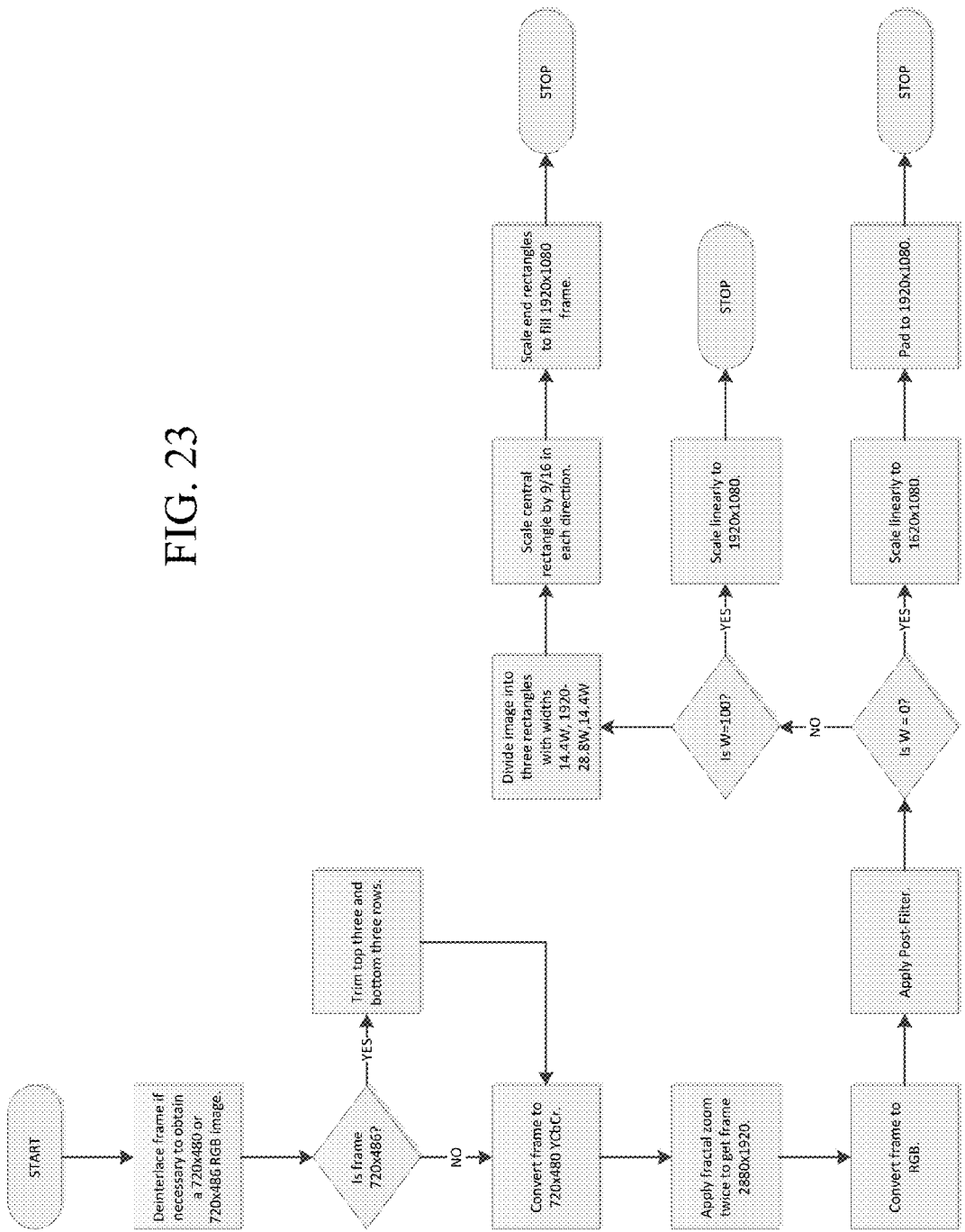

Note that option or case 2 above is exactly what the system generates when W=1440 (i.e., when there is no middle rectangle) and option or case 1 above is a reasonable interpretation for when W=0 (in which case there are no end rectangles). In the preferred embodiment, W is expressed in units of W/14.4, which allows it to be expressed as a percentage of its maximum value. This assumption is made and illustrated in the flowcharts shown in FIGS. 20-22.

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A computerized system for up-scaling a source video having a lower, first resolution to a desired output video having a higher, second resolution, wherein each video is comprised of a plurality of sequentially-ordered frames of images and wherein each respective frame of images is comprised of a plurality of pixels and wherein each respective resolution is defined by the number of rows and columns of pixels in the respective frame, comprising:
   at least one processor;
   a memory storage, and
   a computer readable medium that is usable by the at least one processor and is operatively coupled to the memory storage, the computer readable medium having stored thereon a sequence of instructions that, when executed by the at least one processor, causes the execution of the steps of:
      for each respective frame of the source video that needs to be up-scaled, using fractal zooming upon each individual source pixel of the respective frame to generate a plurality of proposed replacement pixels for the desired output video to replace the individual source pixel from the source video, wherein the number of proposed replacement pixels is based on a zoom factor X, wherein X is an integer value greater than 1, and wherein the number of proposed replacement pixels equals X number of proposed replacement pixels in both the horizontal and the vertical dimensions of a corresponding proposed replacement frame, wherein the proposed replacement frame has an interim resolution equal to or greater than the higher, second resolution of the desired output video, wherein the step of using fractal zooming upon each individual source pixel to generate a plurality of proposed replacement pixels includes (i) identifying a plurality of candidate pixels from the source video and (ii) selecting a group of X squared pixels from the plurality of candidate pixels that best matches the individual source pixel to be the plurality of proposed replacement pixels;
      converting each of the proposed replacement pixels in each of the corresponding proposed replacement frames into the desired color space for the desired output video;
      processing each proposed replacement frame through a low-pass filter to reduce noise in the image associated with each respective proposed replacement frame;
      if the interim resolution of each of the proposed replacement frames is greater than the second resolution of the desired output video, down-sampling each of the proposed replacement frames to generate respective final frames, wherein each respective final frame is set to the second resolution of the desired output video; and
      outputting each of the respective final frames to generate, when viewed in sequential order, the desired output video, which is the up-scaled version of the original video.

2. The system of claim 1, wherein the computer readable medium further causes execution of the step of receiving all or a portion of the source video.

3. The system of claim 2, wherein all or a portion of the source video is stored in the memory storage.

4. The system of claim 2, wherein the step of receiving all or a portion of the source video includes receiving a portion of the source video in a video streaming feed.

5. The system of claim 1, wherein the computer readable medium further causes execution of the step of de-interlacing the source video.

6. The system of claim 1, wherein the computer readable medium further causes execution of the step of de-interlacing each respective frame of the source video as it is received.

7. The system of claim 1, wherein the computer readable medium further causes execution of the step of confirming that the lower, first resolution of the source video is at a desired starting resolution before performing the step of using fractal zooming.

8. The system of claim 1, wherein the computer readable medium further causes execution of the step of trimming rows of pixels from each respective frame of the source video to set the lower, first resolution of the source video to the desired starting resolution.

9. The system of claim 1, wherein the computer readable medium further causes execution of the step of trimming columns from each respective frame of the source video to set the lower, first resolution of the source video to the desired starting resolution.

10. The system of claim 1, wherein the computer readable medium further causes execution of the step of confirming that the pixels of the source video are in a desired color space before performing the step of using fractal zooming.

11. The system of claim 1, wherein the computer readable medium further causes execution of the step of converting the pixels of each respective frame of the source video into a predetermined color space before performing the step of using fractal zooming.

12. The system of claim 11, wherein the predetermined color space is selected from the group consisting of RGB, YUV, and YCbCr.

13. The system of claim 1, wherein the step of identifying a plurality of candidate pixels from the source video includes dividing each respective frame of the source video into a plurality of non-overlapping domain blocks.

14. The system of claim 13, wherein each domain block comprises one of the respective individual source pixels and is surrounded by a plurality of context pixels to define a 3×3 block of pixels, each domain block being unique to its respective individual source pixel of the respective frame.

15. The system of claim 13, wherein the step of identifying a plurality of candidate pixels from the source video further includes defining a plurality of range blocks for each of the respective frames, wherein the number of pixels in each of the plurality of range blocks is the same as the number of pixels in each of the plurality of domain blocks.

16. The system of claim 15, wherein the pixels in each range block are computed by a filtering operation applied to the respective frame of the source video at locations spread out by a constant factor greater than 1 in both the horizontal and the vertical dimensions.

17. The system of claim 16, wherein each range block is comprised of nine pixel values, each pixel value representing the average of a block of 4 adjacent and non-overlapping pixels taken from a 6×6 block of pixels from the respective frame and wherein the 4 central pixels of each range block represent one of the group of X squared pixels from the plurality of candidate pixels.

18. The system of claim 17, wherein the step of selecting a group of X squared pixels from the plurality of candidate pixels that best matches the individual source pixel comprises comparing the domain block associated with the individual source pixel with a plurality of range blocks within a predetermined distance from the respective domain block and selecting the 4 central pixels from the most similar range block as the plurality of proposed replacement pixels to replace the individual source pixel in the proposed replacement frame.

19. The system of claim 18, wherein the 4 central pixels from the most similar range block selected as the plurality of proposed replacement pixels to replace the individual source pixel in the proposed replacement frame are multiplied by a factor p.

20. The system of claim 19, wherein the value of p is set to a value between ½ and 1.

21. The system of claim 18, wherein the step of selecting a group of X squared pixels from the plurality of candidate pixels that best matches the individual source pixel comprises comparing intensity values and distance metrics between the domain block associated with the individual source pixel and with the plurality of range blocks within a predetermined distance from the respective domain block.

22. The system of claim 1, wherein the step of fractal zooming is performed separately for each color component of each of the respective individual source pixels of the respective frame.

23. The system of claim 1, wherein the step of fractal zooming is performed simultaneously for each color component of each of the respective individual source pixels of the respective frame.

24. The system of claim 23, wherein the step of selecting a group of X squared pixels from the plurality of candidate pixels that best matches the individual source pixel to be the plurality of proposed replacement pixels comprises comparing luminance and chrominance values.

25. The system of claim 23, wherein the step of selecting a group of X squared pixels from the plurality of candidate pixels that best matches the individual source pixel to be the plurality of proposed replacement pixels comprises just comparing luminance values.

26. The system of claim 23, wherein the step of selecting a group of X squared pixels from the plurality of candidate pixels that best matches the individual source pixel to be the plurality of proposed replacement pixels comprises comparing luminance and chrominance values, but weighing the luminance value higher than the chrominance values.

27. The system of claim 1, wherein the computer readable medium further causes execution of the step of applying artifact filtering to each of the plurality of proposed replacement pixels in the corresponding proposed replacement frame to ensure that each of the plurality of proposed replacement pixels does not differ above a first predetermined threshold from its adjacent pixels in the corresponding proposed replacement frame.

28. The system of claim 1, wherein the computer readable medium further causes execution of the step of applying smoothing techniques to each of the plurality of proposed replacement pixels in the corresponding proposed replacement frame to ensure that each of the plurality of proposed replacement pixels does not differ above a second predetermined threshold from its respective source pixel from its respective frame of the source video.

29. The system of claim 1, wherein the step of downsampling comprises uses of linear methods to reduce the resolution of each respective final frame.

30. The system of claim 29, wherein the step of downsampling further comprises uses of padding methods to add width to the resolution of each respective final frame.

* * * * *